US012557033B2

(12) United States Patent
Chauvin et al.

(10) Patent No.: US 12,557,033 B2
(45) Date of Patent: Feb. 17, 2026

(54) ANTENNA-AWARE ENERGY RESERVATION FOR RADIO FREQUENCY EXPOSURE COMPLIANCE

(71) Applicant: QUALCOMM Incorporated, San Diego, CA (US)

(72) Inventors: Michel Chauvin, San Diego, CA (US); Arnaud Meylan, San Diego, CA (US); Aman Arora, San Diego, CA (US); Sai Krishna Boyapati, Hyderabad (IN); Tianpei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 18/189,838

(22) Filed: Mar. 24, 2023

(65) Prior Publication Data

US 2024/0323861 A1    Sep. 26, 2024

(51) Int. Cl.
*H04W 52/22*    (2009.01)
*H04W 52/24*    (2009.01)

(52) U.S. Cl.
CPC ....... *H04W 52/223* (2013.01); *H04W 52/248* (2013.01)

(58) Field of Classification Search
None
See application file for complete search history.

(56) References Cited

U.S. PATENT DOCUMENTS

2017/0064641 A1* 3/2017 Logan ................. H04W 52/367
2017/0293342 A1* 10/2017 Field ......................... G06F 1/26
2022/0116949 A1 4/2022 Nadakuduti et al.

OTHER PUBLICATIONS

International Search Report and Written Opinion—PCT/US2024/016942—ISA/EPO—Jun. 18, 2024.

* cited by examiner

*Primary Examiner* — Frantz Bataille
(74) *Attorney, Agent, or Firm* — Patterson & Sheridan, L.L.P/Qualcomm Incorporated

(57) ABSTRACT

Certain aspects of the present disclosure provide techniques and apparatus for antenna-aware energy reservation for radio frequency (RF) exposure compliance. An example method of wireless communication includes obtaining information associated with a plurality of antenna ports. The method further includes determining one or more reserves based at least in part on the information. The method further includes transmitting a first signal via a first antenna port at a first transmit power determined based at least in part on the one or more reserves while maintaining at least a portion of the one or more reserves for a future transmission via a second antenna port.

30 Claims, 7 Drawing Sheets

ANTENNA-AWARE ENERGY RESERVATION FOR RADIO FREQUENCY EXPOSURE COMPLIANCE

BACKGROUND

Field of the Disclosure

Aspects of the present disclosure relate to wireless communications, and more particularly, to radio frequency (RF) exposure compliance.

Description of Related Art

Wireless communication systems are widely deployed to provide various telecommunication services such as telephony, video, data, messaging, broadcasts, etc. Modern wireless communication devices (such as cellular telephones) are generally mandated to meet radio frequency (RF) exposure limits set by certain governments and international standards and regulations. To ensure compliance with the standards, such devices may undergo an extensive certification process prior to being shipped to market. To ensure that a wireless communication device complies with an RF exposure limit, techniques have been developed to enable the wireless communication device to assess RF exposure from the wireless communication device and adjust the transmission power of the wireless communication device accordingly to comply with the RF exposure limit.

SUMMARY

Some aspects provide a method of wireless communication by a wireless device. The method includes obtaining information associated with a plurality of antenna ports. The method further includes determining one or more reserves based at least in part on the information. The method further includes transmitting a first signal via a first antenna port at a first transmit power determined based at least in part on the one or more reserves while maintaining at least a portion of the one or more reserves for a future transmission via a second antenna port.

Some aspects provide an apparatus for wireless communication. The apparatus includes a memory and a processor coupled to the memory. The processor is configured to obtain information associated with a plurality of antenna ports; determine one or more reserves based at least in part on the information; and control transmission of a first signal via a first antenna port at a first transmit power determined based at least in part on the one or more reserves while maintaining at least a portion of the one or more reserves for a future transmission via a second antenna port.

Some aspects provide an apparatus for wireless communication. The apparatus includes means for obtaining information associated with a plurality of antenna ports. The apparatus further includes means for determining one or more reserves based at least in part on the information. The apparatus further includes means for transmitting a first signal via a first antenna port at a first transmit power determined based at least in part on the one or more reserves while maintaining at least a portion of the one or more reserves for a future transmission via a second antenna port.

Some aspects provide a computer-readable medium. The computer-readable medium includes instructions stored thereon for obtaining information associated with a plurality of antenna ports, determining one or more reserves based at least in part on the information, and transmitting a first signal via a first antenna port at a first transmit power determined based at least in part on the one or more reserves while maintaining at least a portion of the one or more reserves for a future transmission via a second antenna port.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized in other aspects without specific recitation.

DETAILED DESCRIPTION

Figure 1:
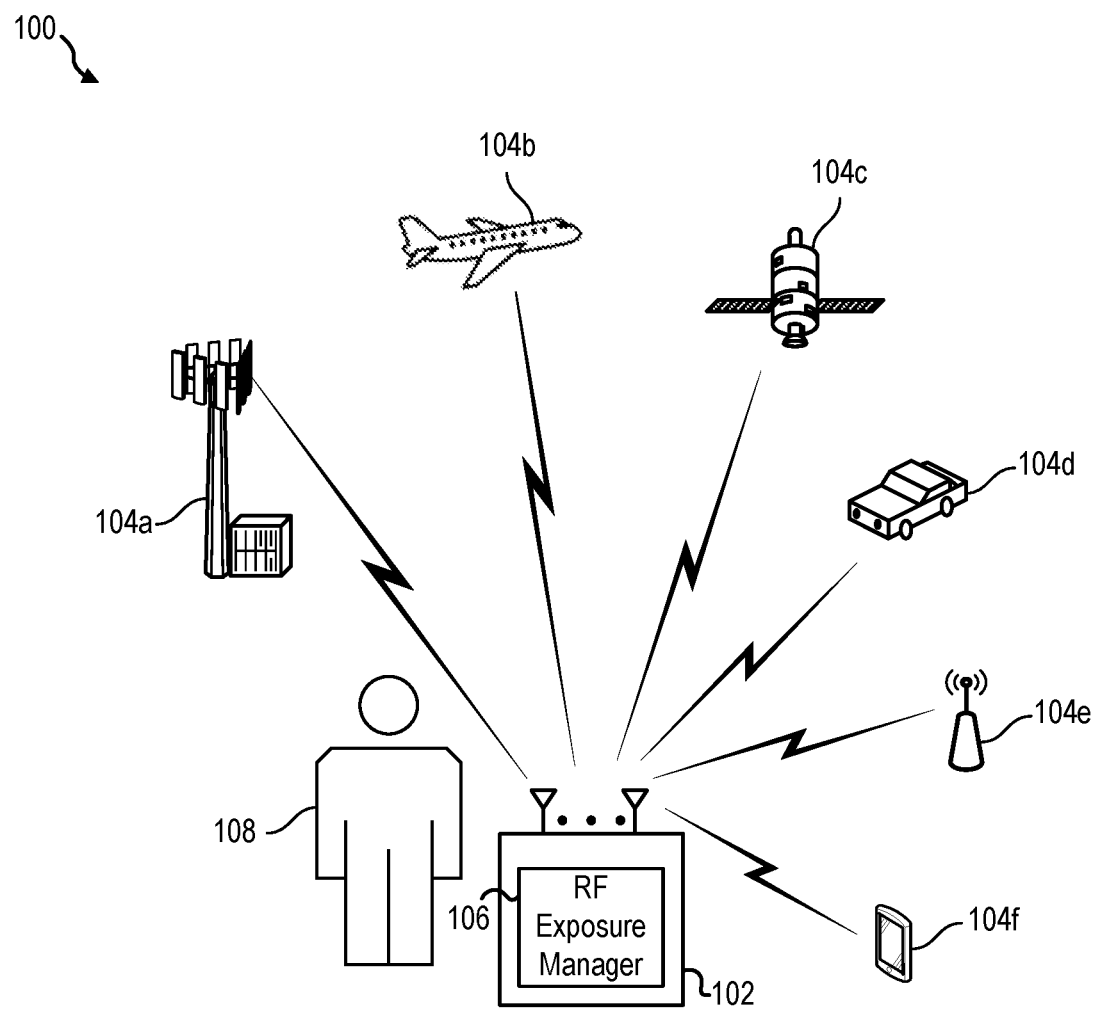
FIG. 1 is a block diagram conceptually illustrating an example wireless communication system exhibiting radio frequency (RF) exposure to a human.

Aspects of the present disclosure provide apparatus, methods, processing systems, and computer-readable mediums for complying with radio frequency (RF) exposure limit(s) using an antenna-aware energy reservation.

In some cases, a wireless communication device may communicate by switching among multiple antenna ports, which may have varying RF exposure limits and/or maximum allowed transmit powers. For example, the wireless device may communicate via a first antenna port in a first transmission occasion, and in a second transmission occasion, the wireless device may communicate via a second antenna port. The first antenna port may have a particular RF exposure limit, and the second antenna port may have an RF exposure limit that is lower relative to the limit associated with the first antenna port. As used herein, an antenna port may refer to one or more (logical or physical) output ports and/or transmission paths (e.g., transmit/transmission chains) configured to emit an RF signal via any of one or more frequency bands, one or more transceivers, and/or one or more radio access technologies (RATs) (e.g., wireless wide area network (WWAN), wireless local area network (WLAN), short-range communications (e.g., Bluetooth), non-terrestrial communications, vehicle-to-everything (V2X) communications, etc.) used for wireless communications. For example, for uplink carrier aggregation (or multi-connectivity) in WWAN communications, each of the active component carriers used for wireless communications may be treated as a separate antenna port. Similarly, multi-band transmissions for IEEE 802.11 may be treated as separate antenna ports for each frequency band (e.g., 2.4 GHz, 5 GHz, or 6 GHz). For beamforming, the one or more antenna elements, the one or more antenna arrays, and/or the one or more antenna modules used to emit a particular beam may be treated as a separate antenna port, such that each of a plurality of antenna ports may correspond to one or more different beams.

The wireless device may transmit signals at transmit powers in compliance with an RF exposure limit. The wireless device may evaluate transmit powers over a rolling (e.g., moving or running) time window in order to comply with a time-averaged RF exposure limit. In some cases, the wireless device may reserve energy in the time window for certain communications (e.g., priority communications and/or services). The wireless device may consider the properties associated with the active antenna port (e.g., the first antenna port) when determining the amount of energy to reserve for such communications. When switching to a different antenna port, the energy reserved by the device for a previous antenna port (e.g., the first antenna port) may not be sufficient to satisfy the energy specifications of the new antenna port (e.g., the second antenna port), for example, due to a differing RF exposure limit associated with the new antenna port. In such cases, the wireless device may not allocate enough energy to transmit certain lower priority communications or to maintain a target power level or maintain the high priority communications. As a result, the communications relying on the reserved energy may degrade in performance (e.g., a reduced transmit power may cause reduced throughput, increased latency, and/or reduced range) and/or temporarily pause transmission in order to comply with the RF exposure limit.

Aspects of the present disclosure provide apparatus and methods for an antenna-aware energy reservation. A wireless device may consider the transmit power properties associated with multiple antenna ports when determining an energy reservation for certain communications (e.g., high priority communications and/or a high-power buffer). As an example, the wireless device may maintain a history buffer of information associated with multiple antenna ports, such as all of the antenna ports that the wireless device is capable of using or a subset of such antenna ports, as further described herein. The history buffer may include any of various information for each of the antenna ports, such as a maximum transmit power (e.g., $P_{CMAX}$), a maximum time-averaged transmit power (e.g., $P_{limit}$), a target power, etc. The wireless device may determine the reserved energy for certain communications based on the history buffer. For example, the wireless device may set the reserved energy to an amount that will work for the antenna port having the most demanding transmit power properties (e.g., lowest maximum transmit power and/or lowest maximum time-averaged transmit power). In such a case, the wireless device can switch to the most demanding antenna port in terms of transmit power properties and maintain an expected level of performance for certain communications (e.g., the communications relying on the reserved energy).

The apparatus and methods for antenna-aware energy reservation described herein may provide any of various advantages. The apparatus and methods described herein may allow the wireless device to set aside enough energy for certain communications regardless of the antenna port being used for communications, thereby allowing the wireless device to switch among antenna ports without impacting the performance of certain communications associated with the reserved energy. In such cases, the wireless device may experience increased throughput, decreased latency, and/or increased communication range due to the antenna-aware reservation described herein.

Example RF Exposure Compliance

FIG. 1 illustrates an example wireless communication system 100 in which aspects of the present disclosure may be performed. For example, the wireless communication system 100 may include a wireless wide area network (WWAN) and/or a wireless local area network (WLAN). For example, a WWAN may include a New Radio system (e.g., a 5G NR network), an Evolved Universal Terrestrial Radio Access (E-UTRA) system (e.g., a 4G network), a Universal Mobile Telecommunications System (UMTS) (e.g., a 2G/3G network), a code division multiple access (CDMA) system (e.g., a 2G/3G network), any future WWAN system, or any combination thereof. A WLAN may include a wireless network configured for communications according to an IEEE standard such as one or more of the 802.11 standards, etc. In some cases, the wireless communication system 100 may include a device-to-device (D2D) communications network or a short-range communications system, such as Bluetooth communications.

As illustrated in FIG. 1, the wireless communication system 100 may include a first wireless device 102 communicating with any of various second wireless devices 104a-f (a second wireless device 104) via any of various radio access technologies (RATs), where a wireless device may refer to a wireless communication device. The RATs may include, for example, WWAN communications (e.g., E-UTRA and/or 5G NR), WLAN communications (e.g., IEEE 802.11), vehicle-to-everything (V2X) communications, non-terrestrial network (NTN) communications, short range communications (e.g., Bluetooth), etc.

The first wireless device 102 may be emitting RF signals in proximity to a human 108, who may be the user of the first wireless device 102 and/or a bystander. As an example, the first wireless device 102 may be held in the hand of the human 108 and/or positioned against or near the head of the human 108. In certain cases, the first wireless device 102 may be positioned in a pocket or bag of the human 108. In some cases, the first wireless device 102 may positioned proximate to the human 108 as a mobile hotspot. To ensure the human 108 is not overexposed to RF emissions from the first wireless device 102, the first wireless device 102 may control the transmit power associated with the RF signals in accordance with an RF exposure limit, as further described herein, where the RF exposure limit may depend on corresponding exposure scenario (e.g., head exposure, hand (extremity) exposure, body (body worn) exposure, hotspot exposure, etc.).

The first wireless device 102 may include any of various wireless communication devices including a user equipment (UE), a wireless station, an access point, a customer-premises equipment (CPE), etc. In certain aspects, the first wireless device 102 includes an RF exposure manager 106 that performs antenna-aware energy reservation, in accordance with aspects of the present disclosure.

The second wireless devices 104*a-f* may include, for example, a base station 104*a*, an aircraft 104*b*, a satellite 104*c*, a vehicle 104*d*, an access point 104*e*, and/or a UE 104*f*. Further, the wireless communication system 100 may include terrestrial aspects, such as ground-based network entities (e.g., the base station 104*a* and/or access point 104*e*), and/or non-terrestrial aspects, such as the aircraft 104*b* and the satellite 104*c*. which may include network entities on-board (e.g., one or more base stations) capable of communicating with other network elements (e.g., terrestrial base stations) and/or user equipment.

The base station 104*a* may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. The base station 104*a* may provide communications coverage for a respective geographic coverage area, which may sometimes be referred to as a cell, and which may overlap in some cases (e.g., a small cell may have a coverage area that overlaps the coverage area of a macro cell). A base station may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

The first wireless device 102 and/or the UE 104*f* may generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. A UE may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and other terms.

In certain cases, the first wireless device 102 may control the transmit power used to emit RF signals in compliance with an RF exposure limit. RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of $mW/cm^2$. In certain cases, a maximum permissible exposure (MPE) limit in terms of PD may be imposed for wireless communication devices using transmission frequencies above 6 GHz. Frequency bands of 24 GHz to 71 GHz are sometimes referred to as a "millimeter wave" ("mmW" or "mmWave"). The MPE limit is a regulatory metric for exposure based on area, e.g., an energy density limit defined as a number, X, watts per square meter ($W/m^2$) averaged over a defined area and time-averaged over a frequency-dependent time window in order to prevent a human exposure hazard represented by a tissue temperature change. Certain RF exposure limits may be specified based on a maximum RF exposure metric (e.g., SAR or PD) averaged over a specified time window (e.g., 100 or 360 seconds for sub-6 GHz frequency bands or 2 seconds for 60 GHz bands).

SAR may be used to assess RF exposure for transmission frequencies less than 6 GHz, which cover wireless communication technologies such as 2G/3G (e.g., CDMA), 4G (e.g., E-UTRA), 5G (e.g., New Radio (NR) in sub-6 GHz bands), IEEE 802.11 (e.g., a/b/g/n/ac), etc. PD may be used to assess RF exposure for transmission frequencies higher than 6 GHz, which cover wireless communication technologies such as IEEE 802.11ad, 802.11ay, 5G in mmWave bands, etc. Thus, different metrics may be used to assess RF exposure for different wireless communication technologies.

A wireless device (e.g., the first wireless device 102) may capable of transmitting signals using multiple wireless communication technologies and/or frequency bands, and in some cases, capable of simultaneous transmission of such signals. For example, the wireless device may transmit signals using a first wireless communication technology operating at or below 6 GHz (e.g., 3G, 4G, 5G, 802.11a/b/g/n/ac, etc.) and a second wireless communication technology operating above 6 GHz (e.g., mm Wave 5G in 24 to 60 GHz bands, IEEE 802.11ad or 802.11ay). In certain aspects, the wireless device may transmit signals using the first wireless communication technology (e.g., 3G, 4G, 5G in sub-6 GHz bands, IEEE 802.11ac, etc.) in which RF exposure may be measured in terms of SAR, and the second wireless communication technology (e.g., 5G in 24 to 71 GHz bands, IEEE 802.11ad, 802.11ay, etc.) in which RF exposure may be measured in terms of PD.

Figure 2:
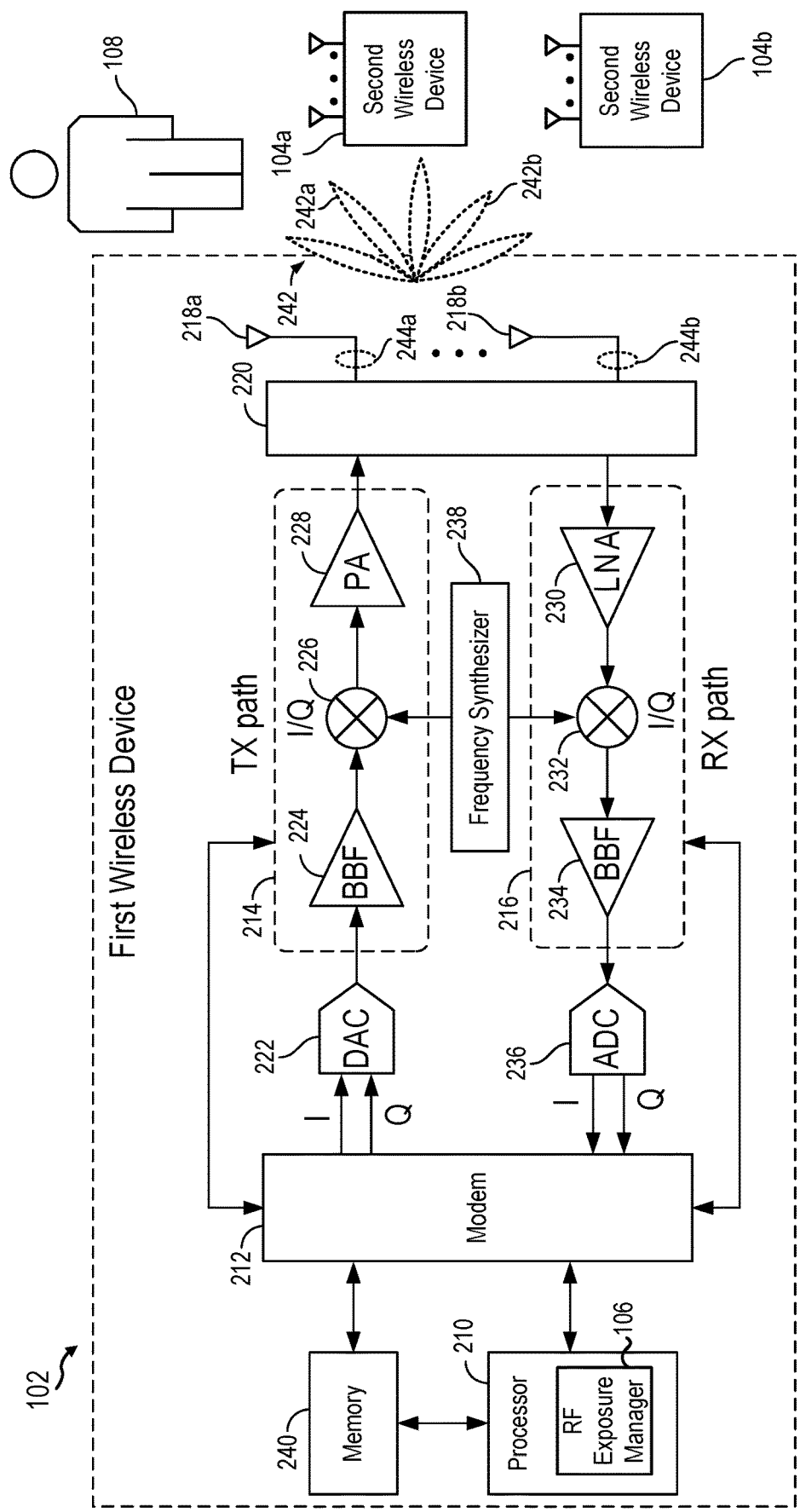
FIG. 2 is a block diagram conceptually illustrating a design of an example wireless communication device communicating with another device.

FIG. 2 illustrates example components of the first wireless device 102, which may be used to communicate with any of the second wireless devices 104*a-f*, in some cases, in proximity to human tissue as represented by the human 108. At the first wireless device 102, a processor 210 may obtain data and/or control information. In certain aspects, the processor 210 may process (e.g., encode and symbol map) the data and control information to obtain data symbols and control symbols, respectively. The processor 210 may perform spatial processing (e.g., precoding) on the data symbols, the control symbols, and/or the reference symbols, if applicable, and may provide output symbol streams to a modem 212. In some cases, aspects of the processor 210 may be integrated with (incorporated in and/or shared with) the modem 212, such as the RF exposure manager 106, a microcontroller, a microprocessor, a baseband processor, a medium access control (MAC) processor, a digital signal processor, etc.

The modem 212 may be coupled to a transmit (TX) path 214 (also known as a transmit chain) for transmitting signals via one or more antennas 218 and a receive (RX) path 216 (also known as a receive chain) for receiving signals via the antennas 218. When the TX path 214 and the RX path 216 share an antenna 218, the paths may be connected with the antenna via an interface 220, which may include any of various suitable RF devices, such as a switch, a duplexer, a diplexer, a multiplexer, and the like. As an example, the modem 212 may output digital in-phase (I) and/or quadrature (Q) baseband signals representative of the respective symbols to a digital-to-analog converter (DAC) 222.

Receiving I or Q baseband analog signals from the DAC 222, the TX path 214 may include a baseband filter (BBF) 224, a mixer 226 (which may comprise one or several mixers), and a power amplifier (PA) 228. The BBF 224 filters the baseband signals received from the DAC 222, and the mixer 226 mixes the filtered baseband signals with a transmit local oscillator (LO) signal to convert the baseband signal to a different frequency (e.g., upconvert from baseband to a radio frequency). In some aspects, the frequency conversion process produces the sum and difference frequencies between the LO frequency and the frequencies of the baseband signal. The sum and difference frequencies are referred to as the beat frequencies. Some beat frequencies are in the RF range, such that the signals output by the mixer 314 are typically RF signals, which may be amplified by the PA 228 before transmission by the antenna 218. The antennas 218 may emit RF signals, which may be received at the second wireless device 104. While one mixer 226 is illustrated, several mixers may be used to upconvert the filtered baseband signals to one or more intermediate frequencies and to thereafter upconvert the intermediate frequency signals to a frequency for transmission.

The RX path 216 may include a low noise amplifier (LNA) 230, a mixer 232 (which may comprise one or several mixers), and a baseband filter (BBF) 234. RF signals received via the antenna 218 (e.g., from the second wireless device 104) may be amplified by the LNA 230, and the mixer 232 mixes the amplified RF signals with a receive local oscillator (LO) signal to convert the RF signal to a baseband frequency (e.g., downconvert). The baseband signals output by the mixer 232 may be filtered by the BBF 234 before being converted by an analog-to-digital converter (ADC) 236 to digital I or Q signals for digital signal processing. The modem 212 may receive the digital I or Q signals and further process the digital signals, for example, demodulating the digital signals.

Certain transceivers may employ frequency synthesizers with a voltage-controlled oscillator (VCO) to generate a stable, tunable LO frequency with a particular tuning range. Thus, the transmit LO frequency may be produced by a frequency synthesizer 238, which may be buffered or amplified by an amplifier (not shown) before being mixed with the baseband signals in the mixer 226. Similarly, the receive LO frequency may be produced by the frequency synthesizer 238, which may be buffered or amplified by an amplifier (not shown) before being mixed with the RF signals in the mixer 232. Separate frequency synthesizers may be used for the TX path 214 and the RX path 216.

The processor 210 and/or modem 212 may control the transmission of signals via the TX path 214 and/or reception of signals via the RX path 216. In some aspects, the processor 210 and/or modem 212 may be configured to perform various operations, such as those associated with the methods described herein. The processor 210 and/or the modem 212 may include a microcontroller, a microprocessor, an application processor, a baseband processor, a MAC processor, a neural network processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 240 may store data and program codes (e.g., computer-readable instructions) for performing wireless communications as described herein. The memory 240 may be external to the processor 210 and/or the modem 212 (as illustrated) and/or incorporated therein. In certain cases, the RF exposure manager 106 (as implemented via the processor 210 and/or modem 212) may determine a transmit power (e.g., corresponding to certain levels of gain(s) applied to the TX path 214 including the BBF 224, the mixer 226, and/or the PA 228) that complies with an RF exposure limit set by country-specific regulations and/or international guidelines (e.g., International Commission on Non-Ionizing Radiation Protection (ICNIRP) guidelines) as described herein.

The first wireless device 102 may be capable of communicating via multiple antenna ports (e.g., the antenna ports 244a, 244b), for example, as multi-band communications, beamformed (or spatially diverse) communications, and/or multi-radio access technology (RAT) communications. For example, in a multi-band context, antennas may be capable of communicating across any of various frequency bands. In some cases, an antenna may be tuned to a specific frequency range or one or more frequency bands. In beamforming, an antenna array—e.g., an array of antenna elements—may emit a radiation pattern in a certain direction and/or with a certain beam shape, where different antenna(s) may be used to emit different beam(s). In some cases, the first wireless device 102 may be capable of communicating via multiple RATs, such as wireless wide area network (WWAN) RAT(s) (e.g., 5G New Radio, Evolved Universal Terrestrial Radio Access (E-UTRA), Universal Mobile Telecommunications System (UMTS) and/or code division multiple access (CDMA)), wireless local area network (WLAN) RATs (e.g., IEEE 802.11), short-range communications (e.g., Bluetooth), non-terrestrial communications, device-to-device (D2D) communications, Internet-of-Things (IoT) communications, ANT+communications, near-field communication (NFC), ultra-wideband (UWB) communications, vehicle-to-everything (V2X) communications, and/or other communications (e.g., future RAT(s)). The RATs may use different antenna(s), antenna elements(s), and/or antenna modules for wireless communications.

As an example of multi-antenna communications, the first wireless device 102 may use beamforming to communicate with the second wireless device(s) 104. The first wireless device 102 may include a plurality of antennas (e.g., the antennas 218a-218b), such as antenna elements, antenna panels, and/or antenna arrays to facilitate the beamforming. In some cases, the first wireless device 102 may transmit and/or receive a beamformed signal via one or more beams 242, each of which may correspond to different transmit and/or receive directions and/or different beam shapes (e.g., a narrow or wide beam shape). For example, the first wireless device 102 may switch from communicating via a first beam 242a using a first antenna port 244a associated with the first antenna 218a to communicating via a second beam 242b using a second antenna port 244b associated with the second antenna 218b. The first wireless device 102 may perform antenna-aware energy aware reservation, as further described herein, which may enable improved performance when switching among antenna ports involved in transmissions.

The term "beam" may be used in the present disclosure in various contexts. Beam may be used to mean a set of gains and/or phases (e.g., pre-coding weights or co-phasing weights) applied to antenna elements in (or associated with)

a wireless device for transmission or reception. The term "beam" may also refer to an antenna or radiation pattern of a signal transmitted while applying the gains and/or phases to the antenna elements. Other references to beam may include one or more properties or parameters associated with the antenna (radiation) pattern, such as angle of arrival (AoA), angle of departure (AoD), gain, phase, directivity, beam width, beam direction (with respect to a plane of reference) in terms of azimuth and elevation, peak-to-side-lobe ratio, or an antenna port associated with the antenna (radiation) pattern. The term "beam" may also refer to an associated number and/or configuration of antenna elements (e.g., a uniform linear array, a uniform rectangular array, or other uniform array).

FIG. 2 shows an example transceiver design. It will be appreciated that other transceiver designs or architectures may be applied in connection with aspects of the present disclosure.

In certain cases, compliance with an RF exposure limit may be performed as a time-averaged RF exposure evaluation within a specified running (moving) time window associated with the RF exposure limit. The RF exposure limit may specify a time-averaged RF exposure metric (e.g., SAR and/or PD) over the running time window. As an example, the Federal Communications Commission (FCC) specifies that certain SAR limits (general public exposure) are 0.08 W/kg, as averaged over the whole body, and a peak spatial-average SAR of 1.6 W/kg, averaged over any 1 gram of tissue (defined as a tissue volume in the shape of a cube) for sub-6 GHz bands, whereas certain PD limits are 1 mW/cm$^2$, as averaged over the whole body, and a peak spatial-average PD of 4 mW/cm$^2$, averaged over any 1 cm$^2$. The FCC also specifies the corresponding averaging time may be six minutes (360 seconds) for sub-6 GHz bands, whereas the averaging time may be 2 seconds for mm Wave bands (e.g., 60 GHz frequency bands).

The RF exposure limit and/or corresponding averaging time window may vary based on the frequency band. In certain aspects, the RF exposure limit(s) and/or corresponding averaging time window(s) may be specific to a particular geographic region or country, such as the United States, Canada, China, or European Union. In some cases, the RF exposure limit(s) may specify the maximum allowed RF exposure that can be encountered without time averaging. In such cases, the maximum allowed RF exposure may correspond to a maximum allowed transmit power that can be used by the wireless device.

Figure 3:
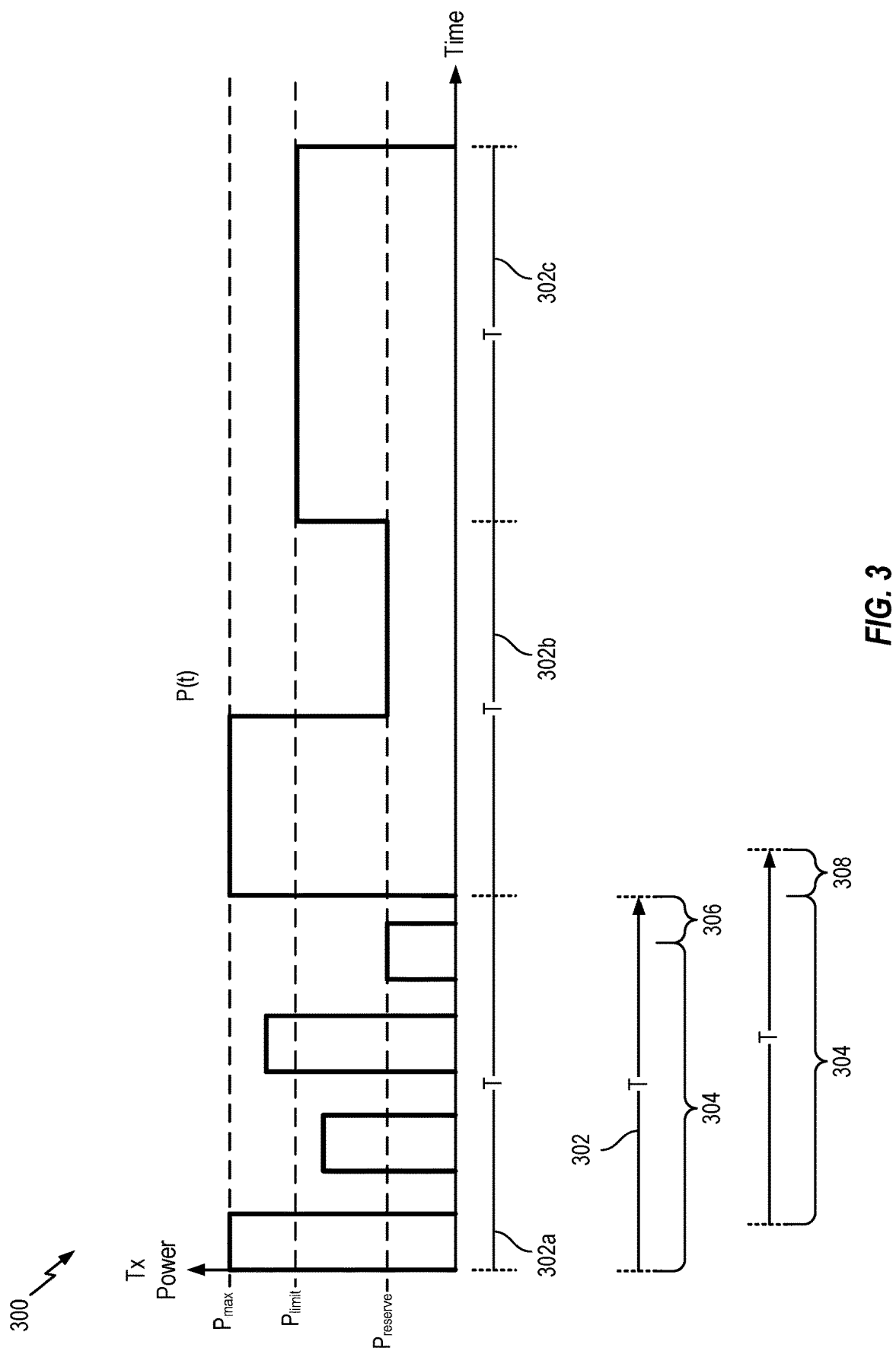
FIG. 3 is a graph illustrating examples of transmit powers over time in compliance with a RF exposure limit.

FIG. 3 is a graph 300 of a transmit power over time (P(t)) that varies over a running (e.g., rolling or moving) time window (T) associated with the RF exposure limit. The wireless device (e.g., the first wireless device 102) may evaluate RF exposure compliance over the running time window 302 (T) based on past RF exposure (e.g., a transmit power report) in a past time interval 304 of the time window 302 and a future time interval 306. The wireless device may determine the maximum allowed transmit power for the future time interval 306 that satisfies the time-averaged RF exposure limit based on the past RF exposure used in the past time interval 304. The wireless device may perform such a time-averaging evaluation as the time window 302 moves over time, for example, in the next future time interval 308, where the past time interval 304 now includes the previous future time interval 306.

The maximum time-averaged transmit power limit ($P_{limit}$) represents the maximum transmit power the wireless device can transmit continuously for the duration of the running time window 302 (T) in compliance with the RF exposure limit. For example, the wireless device is transmitting continuously at $P_{limit}$ in the third time window 302c such that the time-averaged transmit power over the time window (e.g., the third time window 302c) is equal to $P_{limit}$ in compliance with the time-averaged RF exposure limit.

In certain cases, an instantaneous transmit power may exceed $P_{limit}$ in certain transmission occasions, for example, as shown in the first time window 302a and the second time window 302b. In some cases, the wireless device may transmit at $P_{max}$, which may be the maximum instantaneous transmit power supported by the wireless device, the maximum instantaneous transmit power the wireless device is capable of outputting, or the maximum instantaneous transmit power allowed by a standard or regulatory body (e.g., the maximum output power, $P_{CMAX}$). In some cases, the wireless device may transmit at a transmit power less than or equal to $P_{limit}$ in certain transmission occasions, for example, as shown in the first time window 302a.

In certain cases, a reserve power may be used to enable a continuous transmission within a time window (T) when transmitting above $P_{limit}$ in the time window. As shown in the second time window 302b, the transmit power may be backed off from $P_{max}$ to a reserve power ($P_{reserve}$) so that the wireless device can maintain a continuous transmission during the time window (e.g., maintain a radio connection with a receiving entity) in compliance with the time-averaged RF exposure limit. In the third time window 302c, the wireless device may increase the transmit power to $P_{limit}$ in compliance with the time-averaged RF exposure limit. In some cases, $P_{reserve}$ may allow for a certain level of transmission quality for certain transmissions (e.g., control signaling and/or high priority communications, low latency communications, highly reliable communications, etc.). $P_{reserve}$ may be used to reserve transmit power for at least a portion of the time window 302 for certain transmissions (e.g., control signaling). $P_{reserve}$ may also be referred to as a "control power level" or "control level."

In the second time window 302b, the area between $P_{max}$ and $P_{reserve}$ for the time duration of transmitting at $P_{max}$ may be equal to the area between $P_{limit}$ and $P_{reserve}$ for the time window T, such that the area of transmit power (P(t)) in the second time window 302b is equal to the area of $P_{limit}$ for the time window T. Such an area may be considered using 100% of the energy (transmit power or exposure) to remain compliant with the time-averaged RF exposure limit. Without the reserve power $P_{reserve}$, the transmitter may transmit at $P_{max}$ for a portion of the time window with the transmitter turned off for the remainder of the time window to ensure compliance with the time-averaged RF exposure limit.

In some aspects, the wireless device may transmit at a power that is higher than $P_{limit}$, but less than $P_{max}$ in the time-average mode illustrated in the second time window 302b. While a single transmit burst is illustrated in the second time window 302b, it will be understood that the wireless device may instead utilize a plurality of transmit bursts within the time window (T), where the transmit bursts are separated by periods during which the transmit power is maintained at or below $P_{reserve}$. Further, it will be understood that the transmit power of each transmit burst may vary (either within the burst and/or in comparison to other bursts), and that at least a portion of the burst may be transmitted at a power above $P_{limit}$.

In certain aspects, the wireless device may transmit at a power less than or equal to a fixed power limit (e.g., $P_{limit}$) without considering past exposure and/or past transmit powers in terms of a time-averaged RF exposure. For example, the wireless device may transmit at a power less than or equal to $P_{limit}$ using a look-up table (comprising one or more values of $P_{limit}$ depending on an RF exposure scenario). The look-up table may provide one or more values of $P_{limit}$ depending on the transmit frequency, transmit antenna, radio configuration (single-radio or multi-radio) and/or RF exposure scenario (e.g., a device state index corresponding to head exposure, body or torso exposure, extremity or hand exposure, and/or hotspot exposure) encountered by the wireless device. Examples of RF exposure scenarios include cases where the wireless device is emitting RF signals proximate to human tissue, such as a user's head, hand, or body (e.g., torso), or where the wireless device is being used as a hotspot away from human tissue. Therefore, the RF exposure can be managed as a time-averaged RF exposure evaluation (e.g., illustrated in FIG. 3), managed using a look-up table or flat or maximum value, or using another strategy or algorithm, where a particular process of managing the RF exposure may be referred to herein as an RF exposure control scheme.

For certain aspects, a wireless device may exhibit or be configured with a transmission duty cycle. The wireless device may determine transmit power level(s) and/or reserve power level(s) in compliance with the time-averaged RF exposure limit based on the duty cycle. The transmission duty cycle may be indicative of a share (e.g., 5 ms) of a specific period (e.g., 500 ms) in which the wireless device transmits RF signals. The duty cycle may be a ratio of the share to the specific period (e.g., 5 ms/500 ms), where the duty cycle may be represented as a number from zero to one. For example, in the first time window 302a, the duty cycle may be greater than 50% of the duration of the time window (T), whereas in the second time window 302b, the duty cycle may be equal to 100% of the duration of the time window (T). In certain cases, the duty cycle may be standardized (e.g., predetermined) with a specific RAT and/or vary over time, for example, due to changes in radio conditions, mobility, and/or user behavior. As an example, certain RATs may specify the uplink duty cycle in the form of a time division duplexing (TDD) configuration, such as a TDD uplink-downlink (UL-DL) slot pattern in 5G NR or similar TDD patterns in E-UTRA or UMTS. In 5G NR, the TDD UL-DL slot pattern may specify the number of uplink slots and corresponding position in time associated with the uplink slots in a sequence slots, such that the total number of uplink slots with respect to the total number of slots in the sequence is indicative of the duty cycle. In certain aspects, the duty cycle may correspond to the actual duration for past transmissions scheduled or used, for example, within the TDD UL-DL slot pattern. For example, although the wireless device may be configured with a TDD UL-DL slot pattern, the wireless device may use a portion or subset of the UL slots for transmitting RF signals. Thus, the duty cycle for the wireless device may be less than the maximum available duty cycle corresponding to the TDD UL-DL slot pattern.

In certain wireless communication systems (e.g., E-UTRA and/or 5G NR), there are RF emission limits for the output power of wireless devices, for example, to mitigate inter-device interference, and these RF emission limits may be applied in addition to or instead of the RF exposure limits described herein. As an example, under 5G NR standards, the wireless device is allowed to set its configured maximum output power $P_{CMAX,f,c}$ for carrier f of serving cell c in each slot for certain communications. The configured maximum output power $P_{CMAX,f,c}$ is set within the following bounds:

$$P_{CMAX\_L,f,c} \leq P_{CMAX,f,c} \leq P_{CMAX\_H,f,c}$$

where $P_{CMAX\_L,f,c}$ and $P_{CMAX\_H,f,c}$ may be determined based on various parameters, including, for example, a power class, a frequency band, a maximum power reduction (MPR), and/or an additional MPR (A-MPR). In some cases, the MPR associated with different transmit paths (e.g., the TX path 214) may vary across a wireless device, and thus, the maximum output powers associated with different transmit paths may vary. The maximum output power of an active carrier (e.g., component carrier) may depend on the antenna port selection, the power class, the band and frequency of the carrier, the power back offs (e.g., MPR) used to account for hardware path characteristics, etc. The wireless device may apply any of various functions for determining the maximum output power ($P_{CMAX}$), where the functions may be specific to a particular communication scenario, such as carrier aggregation, multi-connectivity (e.g., NR-Dual Connectivity (NR-DC)), V2X, uplink (UL) multiple-input and multiple-output (MIMO), etc. In certain aspects, the wireless device may select the maximum output power as a smallest value (e.g., minimum value) of $P_{CMAX}$ and another output power value (e.g., $P_{PUSCH}$, $P_{PUCCH}$, $P_{SRS}$, and/or $P_{PRACH}$), which may be determined as a function of various parameters, such as a target receive power at a receiving entity (e.g., a base station), the path loss, bandwidth, and in some cases, a power control adjustment parameter.

The antenna ports of the wireless device may have varying RF exposure limits (e.g., differing $P_{limits}$) and/or output power parameters (e.g., $P_{CMAX}$). The wireless device may switch from transmitting with one antenna (or group of antennas, for example, for beamforming or MIMO communications) to transmitting with another antenna (or another group of antennas), for example, as described herein with respect to FIG. 2. The wireless device may switch among antenna ports frequently for any of various reasons. For example, the wireless device may switch between antenna ports due to changes in the RF exposure budgets (e.g., SAR), path loss, traffic activity, wireless device mobility, etc. In some cases, the wireless device may switch to using a different antenna port for transmissions in response to detecting that the respective antenna port provides better communication performance (due to channel conditions and/or RF exposure budgets). For example, the wireless device may monitor the channel conditions (and/or other factors including an RF exposure budget) associated with the antenna ports and select the antenna port exhibiting the best channel conditions (as an example) to use for an upcoming transmission. The antenna port may be selected to maximize throughput, minimize power usage, and/or reduce RF exposure, for example. Some factors, which may affect the antenna port selection, include path loss, a maximum output power (e.g., $P_{CMAX}$), transmit power backoff parameters (e.g., a power headroom report (PHR)), duty cycle, and/or an RF exposure budget (e.g., SAR and/or PD budget). A power management algorithm (e.g., the RF exposure manager 106) may determine the maximum allowed transmit power for a future time interval (e.g., the future time interval 306) based on the RF exposure budget and/or the RF exposure limit associated with an antenna port.

As described herein, the wireless device may evaluate (e.g., as a time-averaging evaluation of past transmit powers or as a maximum allowed transmit power ($P_{limit}$)) transmit powers over a running time window (e.g., the time window 302) in order to comply with a time-averaged RF exposure limit. In some cases, the wireless device may reserve energy (e.g., $P_{reserve}$ as depicted in FIG. 3) in the time window for certain communications (e.g., high priority communications and/or services or certain high power transmissions). The wireless device may consider the properties associated with the active antenna port (e.g., the first antenna port) when determining the amount of energy to reserve for such communications. When switching to a different antenna port, the energy reserved by the device for the previous antenna port may not be sufficient to satisfy the energy specifications of the new active antenna port (e.g., the second antenna port), for example, due to a differing RF exposure limit (e.g., $P_{limit}$) associated with the new antenna port. In such cases, the wireless device may not allocate enough energy to transmit certain lower priority communications or to maintain a target power level or maintain the high priority communication.

In such cases, the wireless device may allocate only a portion of the energy requested for certain communications in response to switching to the different antenna port. As a result, the communications relying on the reserved energy may degrade in performance (e.g., a reduced transmit power may cause reduced throughput, increased latency, and/or reduced range) and/or temporarily pause transmission in order to comply with the RF exposure limit. If the wireless device does not set aside enough power for the communications associated with the reserved energy (e.g., high priority services and the high-power buffer) in the time interval where less demanding antenna ports (e.g., higher $P_{limit}$ and/or $P_{CMAX}$) are active, the wireless device may not have enough energy for subsequent intervals where more demanding antenna ports (e.g., lower $P_{limit}$ and/or $P_{CMAX}$) are active. The wireless device may spend the SAR budget on low priority data. This may result in the wireless device not having enough energy to achieve the target power level. In some cases, the performance of the high priority service (such as voice-over-LTE (VoLTE) and/or voice-over-NR (VoNR), etc.) relying on the reserved energy may degrade, or calls may drop, for example.

As an example, during a period when the wireless device uses a lower normalized reserve energy for high priority services and/or a high-power buffer, the wireless device may not set aside enough energy for a subsequent period where the wireless device uses a higher normalized reserve energy for high priority services and/or the high-power buffer. Suppose, for example, the wireless device is transmitting via a first antenna port, where $P_{CMAX}$ is 26 dBm for the first antenna port, $P_{limit}$ is 23 dBm for the first antenna port, and the duty cycle is 0.1. While using the first antenna port, the wireless device may reserve energy, using these power properties associated with the first antenna port, in each future time interval associated with the rolling time window for high priority services. When the wireless device switches to using a second antenna port for transmissions, the energy reserved using the power properties associated with the first antenna port may not be sufficient for the high priority services, for example, due to the differing transmit power properties associated with the second antenna port, where $P_{CMAX}$ is 23 dBm for the second antenna port, and $P_{limit}$ is 14 dBm. Effectively, the reserved energy takes up a greater portion of the energy available on the second antenna port relative to the first antenna port. For example, the wireless device may reserve four times more energy for high priority services and/or for a high power buffer (e.g., a target power level) when the second antenna port is active. Thus, the lower reserved energy may result in degraded performance and/or a temporary pause in communications, for example, in order to focus on transmitting high priority services and/or for the RF exposure budget to replenish as the running time window moves through time.

Example Antenna-Aware Energy Reservation for Radio Frequency Exposure Compliance Aspects of the present disclosure provide apparatus and methods for an antenna-aware energy reservation. A wireless device may consider the transmit power properties associated with multiple antenna ports when determining an energy reservation for certain communications (e.g., high priority communications and/or a high-power buffer). As an example, the wireless device may maintain a history buffer of information associated with multiple antenna ports, such as all of the antenna ports that the wireless device is capable of using or a subset of such antenna ports, as further described herein. The history buffer may include any of various information for each of the antenna ports, such as a maximum transmit power (e.g., $P_{CMAX}$), a maximum time-averaged transmit power (e.g., $P_{limit}$), a target power, etc. The wireless device may determine the reserved energy for certain communications based on the history buffer. For example, the wireless device may set the reserved energy to an amount that will work for the antenna port having the most demanding transmit power properties (e.g., lowest maximum transmit power and/or lowest maximum time-averaged transmit power). In such a case, the wireless device can switch to the most demanding antenna port in terms of transmit power properties and maintain an expected level of performance for certain communications (e.g., the communications relying on the reserved energy).

The apparatus and methods for antenna-aware energy reservation described herein may provide various advantages. The apparatus and methods described herein may allow the wireless device to set aside enough energy for certain communications (e.g., high priority services and/or a high power transmission burst) regardless of the antenna port being used for communications, thereby allowing the wireless device to switch among antenna ports without impacting the performance of certain communications associated with the reserved energy. For example, the wireless device may reserve a sufficient amount of energy for high priority services, which may ensure that the performance and/or quality of such services is maintained even when the wireless device switches between antenna ports. In such cases, the wireless device may experience increased throughput, decreased latency, and/or increased communication range due to the antenna-aware reservation described herein.

In certain aspects, the wireless device may maintain a history buffer associated with certain antenna ports (e.g., the antenna ports 244a, 244b) in order to determine one or more energy reservations for certain communications. The list of antenna ports may include any of various sets of the antenna ports, such as the antenna ports that were recently used, the antenna ports that are currently active, the antenna ports that have been encountered as being active, or all of the antenna ports that the wireless device is equipped with or capable of using.

The antenna ports that were recently used may include antenna ports that have been involved in transmission in a particular time period, such as a most recent past time period (e.g., the past time interval 304 or any other suitable time period) and/or the most recent N antenna ports to be used, where N is a positive integer. The time period may correspond to an inactivity time threshold as further described herein.

The antenna ports that are currently active may include the antenna ports that will be involved in transmission in a particular time interval (e.g., the future time interval 306). As an example, the wireless device may obtain a list of the currently active antenna ports and determine the most demanding antenna port among such antenna ports. The wireless device may identify the most demanding antenna port based on a relationship between $P_{CMAX}$ and $P_{limit}$ as further described herein. The wireless device may determine the energy reservation for the most demanding antenna port.

The antenna ports that have been encountered as being active may include the antenna ports that have been active during a time the wireless device has been operational, such as when the wireless device has been operational and/or when the wireless device transitioned from a sleep state, idle state, or low power state. For example, the history buffer may be empty or set with certain antenna ports. Every time, the wireless devices encounters a new antenna port, the wireless device may check if that new antenna port is more demanding than other antenna ports. The wireless device stores the characteristics (e.g., semi-static $P_{CMAX}$ and/or $P_{limit}$) of the most demanding antenna port and uses its characteristic to reserve energy.

In certain aspects, the wireless device may obtain a list of all configured antenna ports (e.g., in a static configuration) and use the most demanding antenna port to determine the energy reservation.

The history buffer may include information associated with the antenna ports in the list. The information may include a maximum time-averaged transmit power—e.g., $P_{limit}$ for a SAR limit or MPE limit (e.g., PD limit), a target power, a maximum output power (e.g., $P_{CMAX}$), the last time the antenna port was used, the duration of a time-averaged time window (e.g., the time window 302) associated with the antenna port, or any combination thereof. The information may be used to determine an energy reservation for certain communications regardless of which antenna port is used for transmission among the antenna ports in the list.

For example, the wireless device may identify the antenna port in the list with the most demanding RF exposure limit (e.g., lowest $P_{limit}$) and/or maximum output power (e.g., lowest $P_{CMAX}$). The most demanding antenna port may be determined based on a relationship between the maximum output power ($P_{CMAX}$) and the maximum time-averaged transmit power ($P_{limit}$). For example, the most demanding antenna port may be determined by identifying the antenna port with the greatest difference between the maximum output power ($P_{CMAX}$) and the maximum time-averaged transmit power ($P_{limit}$), where each of the differences (e.g., $ratio_{ap}$) associated with an antenna port may be determined by the following expression:

$$ratio_{ap} = P_{CMAX\_dB,ap} - P_{limit\_dB,ap}$$

where $ratio_{ap}$ is the power difference associated with a particular antenna port, $P_{CMAX\_dB,ap}$ is the maximum output power associated with the particular antenna port in decibel-milliwatts (dBm), and $P_{limit\_dB,ap}$ is the maximum time-averaged transmit power associated with the particular antenna port in dBm.

It will be appreciated that the wireless device may identify an antenna port in the history buffer to determine a suitable energy reservation based on any of various criteria including the most demanding antenna port and/or other criteria. For example, the wireless device may identify the antenna port that has the greatest propensity (or likelihood) to be involved in a transmission, for example, based on a past traffic history. In some cases, the wireless device may identify the antenna port with the best channel conditions among the antenna ports in the history buffer for determining the energy reservation. In certain cases, the wireless device may identify the antenna port with the greatest RF exposure budget for determining the energy reservation.

The wireless device may determine a reserve energy that would be suitable for the selected antenna port (e.g., the most demanding antenna port) based on the transmit properties associated with such an antenna port, such as duty cycle, $P_{limit}$, the duration of the time window, etc. The wireless device may set aside enough SAR/MPE energy for each future time interval (e.g., the future time interval 306) for the most demanding antenna port, enabling the wireless device to communicate via the most demanding antenna port in case the wireless device switches to using that antenna port. As the wireless device has set aside enough energy for the most demanding antenna port, the transmit power can be maintained at the reserve levels when the wireless device switches to the antenna port with higher normalized energy criteria to reach the target transmit power. The wireless device may maintain an expected transmission quality regardless of the antenna port used and avoid degraded performance or dropping calls when switching to the more demanding antenna port.

Figure 4:
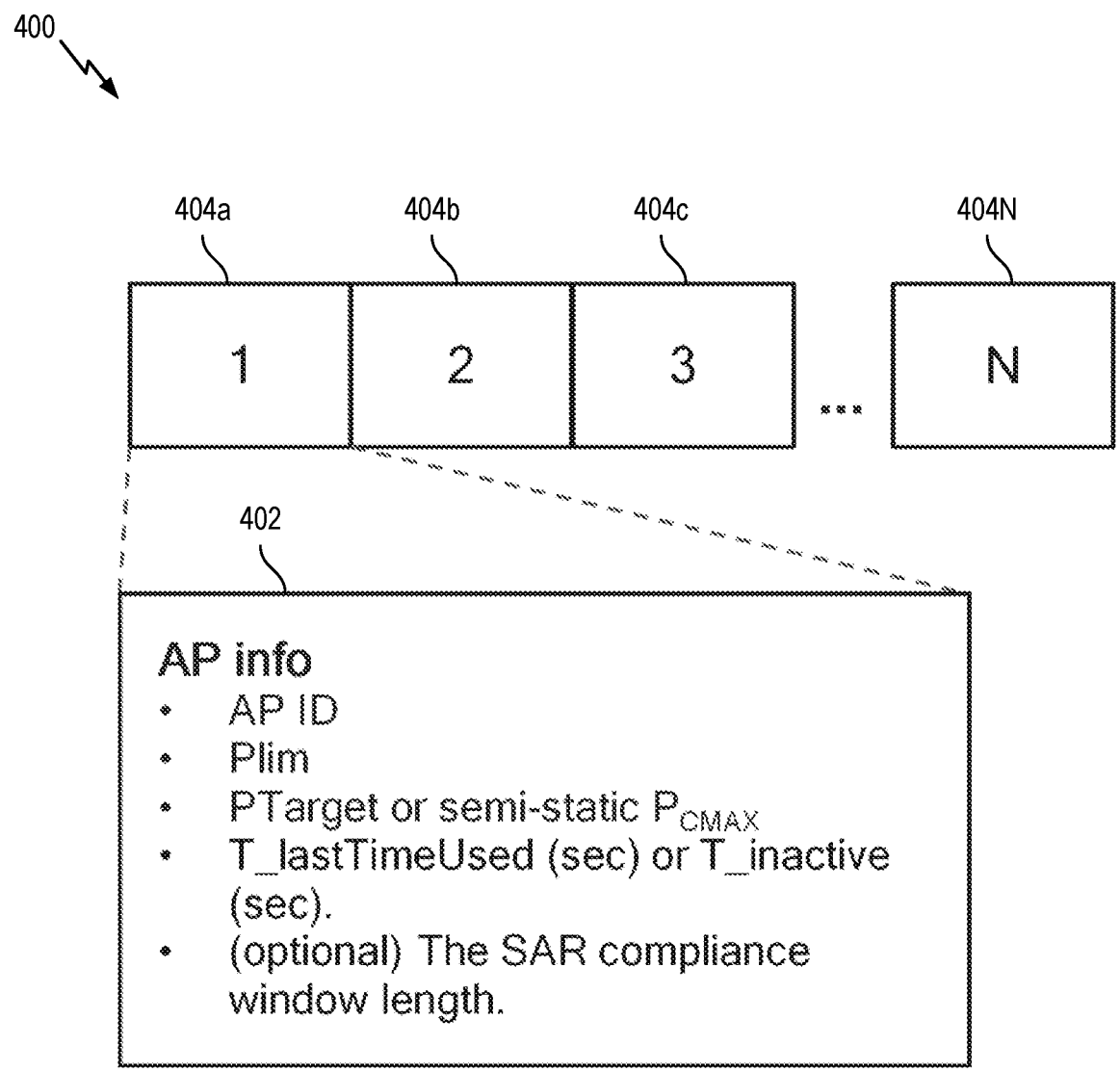
FIG. 4 is a diagram illustrating an example history buffer for antenna-aware energy reservation.

FIG. 4 is a diagram illustrating an example history buffer 400. In this example, the history buffer 400 may be a list of antenna ports evaluated for antenna-aware energy reservation and information 402 associated with these antenna ports. The history buffer 400 may include the information 402 associated with each of the antenna ports 404a-N (collectively "antenna ports 404"), where N is the total number of antenna ports in the history buffer 400. The wireless device may occasionally add antenna port(s) to the history buffer 400 and/or remove antenna port(s) to the history buffer 400. As an example, the antenna ports 404 may include the recently used antenna ports as described herein, where the wireless device may keep only active antenna ports in the history buffer 400.

As shown, the information 402 may include an antenna port identifier (AP ID), the maximum time-averaged transmit power (e.g., $P_{limit}$ or $P_{lim}$), a target transmit power (which may be equal to $P_{CMAX}$), a maximum output power ($P_{CMAX}$), an indication of the last time that the antenna port was used, (optionally) the duration of the time-averaging time window (e.g., the time window 302) associated with the antenna port. The AP ID may be a unique identifier associated with a particular antenna, which may be used for maintaining the antenna ports in the history buffer (e.g., adding or removing antenna ports).

The target transmit power may be a requested transmit power associated with an antenna port. For example, a modem (e.g., the modem 212) or exposure control solution (e.g., an inner loop or a separate control solution) that controls transmissions via an antenna port may request a target transmit power for a future time interval (e.g., the future time interval 306) to a centralized controller, such as the RF exposure manager 106 (which is sometimes referred to as an outer loop). In some cases, the target transmit power may be less than or equal to $P_{CMAX}$ or $P_{max}$ as described herein with respect to FIG. 3.

The time-averaging time window may vary based on the frequency band used for a transmission. As certain antenna ports may be capable of transmitting in particular frequency band(s)—e.g., sub-6 GHz bands and/or mmWave bands, the time window may vary based on the antenna port involved in the transmission. For example, suppose an antenna port is only capable of transmitting in sub-6 GHz bands, the time window may correspond to the RF exposure limit used for sub-6 GHz bands The indication of the last time that the antenna port was used (which may be referred to as an inactivity time) may include a timestamp associated with the last time the antenna port was involved in a transmission. In some cases, the inactivity time associated with an antenna port may include a time counter that tracks the duration for which a particular antenna port has not been involved in a transmission or refrained from being used for a transmission. The inactivity time associated with the antenna port may be used to determine whether to remove an antenna port from a history buffer. For example, if the inactivity time is greater than or equal to a threshold, the wireless device may remove the antenna port (and its corresponding information) from the history buffer.

The wireless device may add or remove an antenna port to the history buffer based on any of various criteria. As an example, the wireless device may add an antenna port to the history buffer in response to the antenna port being or expected to be involved in a transmission. When an antenna port is expected to be involved in a transmission—e.g., in a future time interval, the wireless device may add (in some cases re-add) that antenna port to the history buffer and adjust the reserve energy accordingly. The wireless device may add or remove an antenna port to the history buffer in response to changes in any of various criteria, such as traffic activity (e.g., greater or lesser traffic), types of traffic (e.g., voice, gaming traffic, streaming content, etc.), an expected latency (e.g., greater or reduced latency), user behavior, mobility, time of day, etc. In some cases, the history buffer may be configured to permanently (or semi-statically) include (or exclude) a particular antenna port and its corresponding information.

As an example of maintaining the history buffer, suppose the wireless device is transmitting via one or more first antenna ports (e.g., the first antenna port 244a), when the wireless device switches (or expects to switch) to using one or more second antenna ports (e.g., the second antenna ports 244b), the wireless device may update the history buffer with the inactivity time associated with the first antenna port(s). In some cases, in response to switching to the second antenna port(s) or expecting to switch to the second antenna port(s)—for example—in a future time interval, the wireless device may identify any outdated antenna ports in the history buffer and remove such antenna ports from the history buffer. If the second antenna ports(s) are already in the history buffer, the wireless device may update the information associated with the antenna ports in the history buffer (if there are any updates to such information) in response to switching to the second antenna port(s). For example, the wireless device may update $P_{limit}$, $P_{CMAX}$, the inactivity time, and/or the time-averaging time window if there are any updates to these parameters. If the second antenna port(s) are not in the history buffer, the wireless device may add the second antenna port(s) to the history buffer and the corresponding information (if there is enough space in the history buffer). If there is not enough space in the history buffer, the wireless device may remove the oldest (or outdated) antenna port (e.g., based on the respective inactivity time and/or the time in the history buffer) until there is enough space to add the second antenna port(s) to the history buffer.

An outdated antenna port may mean an antenna port that has not been used for transmission for a certain period of time (e.g., an inactivity time threshold, $T_{inactivity}$), where the inactivity time threshold may be a fixed or dynamic time duration. In some cases, the inactivity time threshold may correspond to the time-averaging time window (e.g., the time window 302) associated with that particular antenna port or any of the other antenna ports (in the history buffer). As an example, the inactivity time threshold may be determined according to the following expression:

$$T_{inactivity} = T_{RFexposureWindow} \cdot F$$

where $T_{RFexposureWindow}$ is a time-averaging time window associated with an RF exposure limit, and F is a scaling factor used to adjust the inactivity time threshold. As an example, F may be equal to 1.2 for 20% more than the time-averaging time window.

Figure 5:
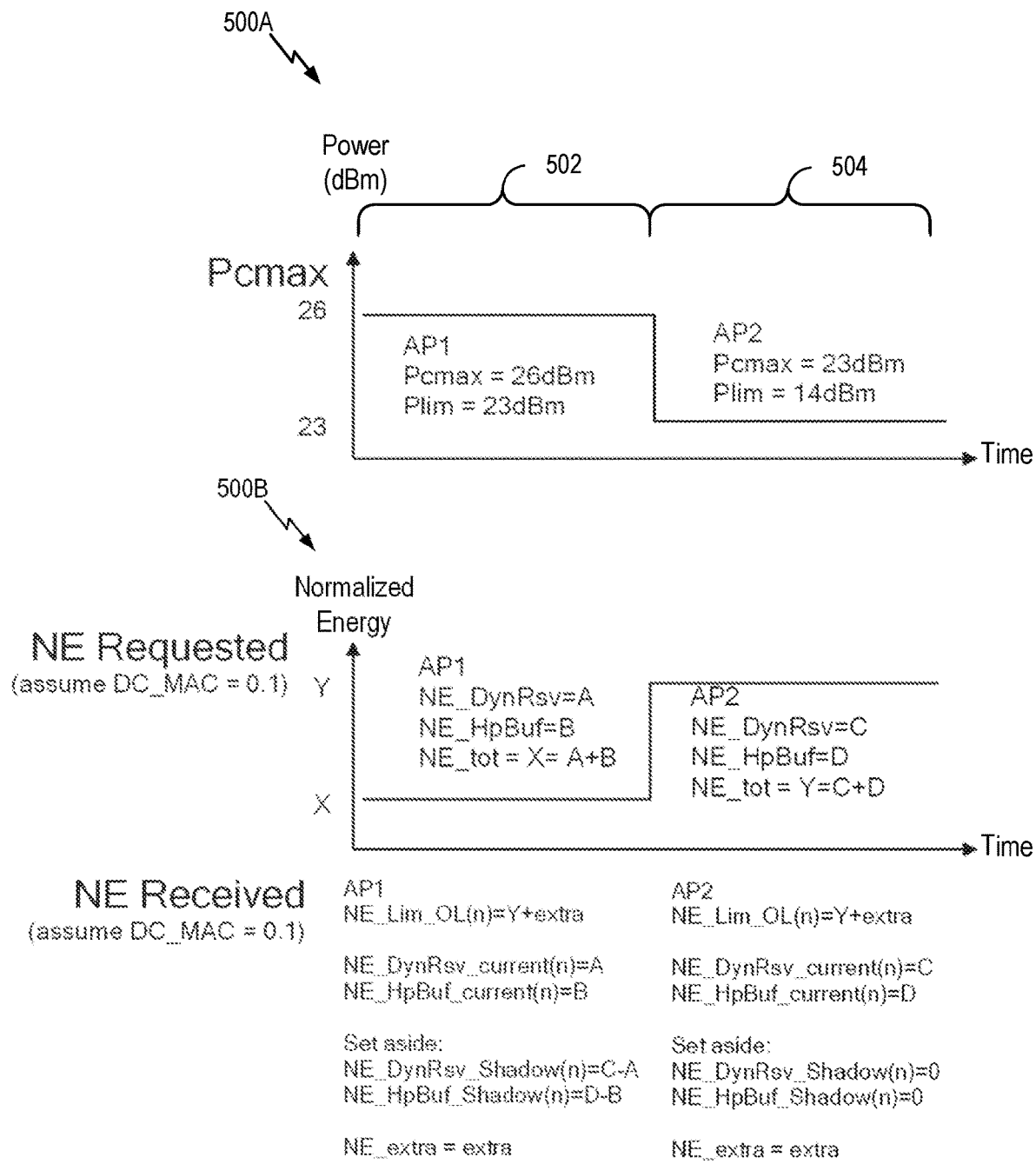
FIG. 5 shows timing diagrams of an example energy reservation being applied when switching from one antenna port to another antenna port.

FIG. 5 depicts a first graph 500A showing example transmit powers over time and a second graph 500B showing the corresponding normalized exposure requested, where energy is reserved as described herein. In this example, a wireless device may have a first antenna port (e.g., the first antenna port 244a) and a second antenna port (e.g., the second antenna port 244b). For the first antenna port, $P_{CMAX}$ is 26 dBm, $P_{limit}$ is 23 dBm, and the duty cycle is 0.1—whereas for the second antenna port, $P_{CMAX}$ is 23 dBm, $P_{limit}$ is 14 dBm, and the duty cycle may be (assumed to be) the same.

In a first transmission occasion 502 when the first antenna port is active (e.g., involved in a transmission), the wireless device may set aside enough energy for the second antenna port based on the transmission characteristics associated with the second antenna port (e.g., $P_{CMAX}$ is 23 dBm, and $P_{limit}$ is 14). In certain aspects, the reserve energy (which may be normalized to an RF exposure limit such as $P_{limit}$) may include a first reserve energy (e.g., NE_DynRsv=A) for certain communications (e.g., high priority communications) and/or a second reserve energy (e.g., NE_HpBuf=B) for high power transmissions (e.g., a high power burst up to $P_{max}$ as depicted in FIG. 3). As communications may include transmission(s) and/or reception(s), the first reserve energy for the certain communications may correspond to the transmission(s) associated with such communications, for example, high priority communications, low latency communications, high reliability communications, etc. The total reserve energy may be equal to X as a sum of A and B associated with the respective reserves as shown in FIG. 5. For example, the second antenna port may be the most demanding antenna port (or any other suitable criteria) as selected among the antenna ports in the history buffer (e.g., the history buffer 400). The wireless device may treat the energy set aside for the second antenna port as extra energy (e.g., NE_DynRsv_Shadow=C–A and/or NE_HpBuf_Shadow=D–B) added to the respective base reserve(s) (e.g., NE_DynRsv and/or NE_HpBuf). The reservations used for the second antenna port may be equal to C for NE_DynRsv and D for NE_HpBuf, where the total reserve energy may be equal to Y as a sum of C and D associated with the respective reserves as shown in FIG. 5. In a second transmission occasion 504 when the second antenna port is active, the wireless device may have a sufficient amount of energy for the communications associated with the first reserve energy (e.g., NE_DynRsv=C) and/or the second reserve energy (e.g., NE_HpBuf=D), for example, due to the reservation made in the first transmission occasion 502. In some cases, the wireless device may refrain from setting aside any extra energy (e.g., the shadow energy=0) for the reserve(s) in the second transmission occasion 504. It will be appreciated that the wireless device may maintain any number of reserves for the second antenna port and that the two reserves (e.g., high priority communications and high power transmissions) described herein are examples.

In certain aspects, the wireless device may update the allocation of the reserve(s), update the history buffer, and/or update how the history buffer is maintained, for example, in response to one or more certain criteria being satisfied. For example, if the wireless device detects that the reserve(s) are not being fully used (e.g., partial usage and/or no usage for the future transmission), the wireless device may temporarily eliminate the reserves or adjust the amount of reserves allocated for the particular antenna port identified based on the history buffer. In some cases, the wireless device may select a different approach at maintaining the history buffer in response to detecting that the reserve(s) are not being fully used. For example, the wireless device may transition from maintaining the history for all of the antenna ports to a subset of the antenna ports, such as the various subsets described herein.

Figure 6:
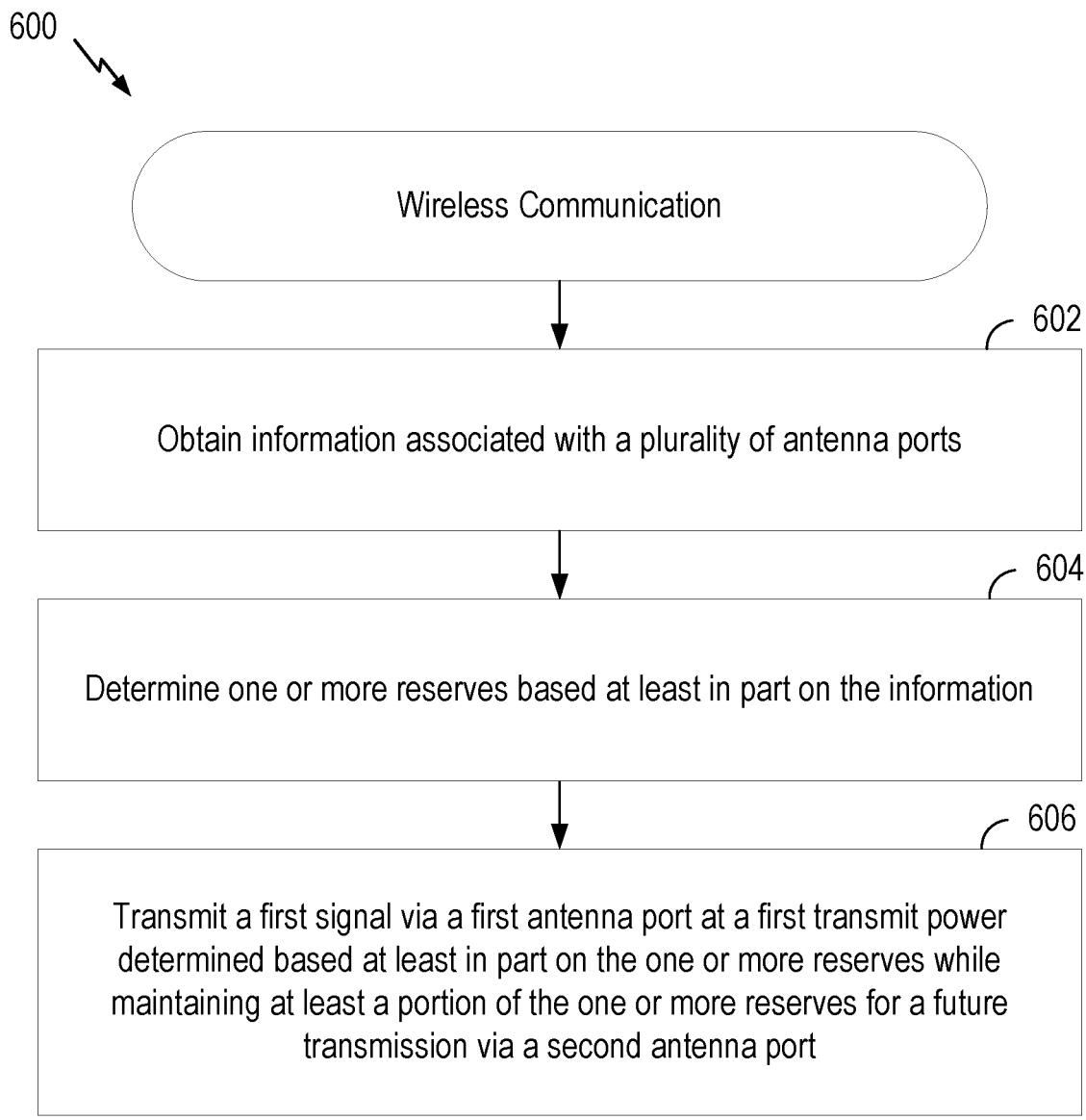
FIG. 6 is a flow diagram illustrating example operations for wireless communication by a wireless device.

FIG. 6 is a flow diagram illustrating example operations 600 for wireless communication. The operations 600 may be performed, for example, by a wireless device (e.g., the first wireless device 102 in the wireless communication system 100). The operations 600 may be implemented as software components that are executed and run on one or more processors (e.g., the processor 210 and/or the modem 212 of FIG. 2). Further, the transmission and/or reception of signals by the wireless device in the operations 600 may be enabled, for example, by one or more antennas (e.g., antennas 218 of FIG. 2). In certain aspects, the transmission and/or reception of signals by the wireless device may be implemented via a bus interface of one or more processors (e.g., the processor 210 and/or the modem 212) obtaining and/or outputting signals for reception or transmission.

The operations 600 may optionally begin, at block 602, where the wireless device may obtain information (e.g., the information 402) associated with a plurality of antenna ports (e.g., the antenna ports 404). To obtain the information, the wireless device may track the information as a history buffer (e.g., the history buffer 400) associated with the plurality of antenna ports. The wireless device may maintain the history buffer associated with the antenna ports as described herein with respect to FIG. 4. For example, the wireless device may occasionally add antenna port(s) to the history buffer and/or remove antenna port(s) from the history buffer in response to any of various criteria, such as the wireless device switching to a new antenna port or an antenna port becoming outdated.

At block 604, the wireless device may determine one or more reserves (e.g., $P_{reserve}$ or a reserve of normalized energy as depicted in FIG. 5) based at least in part on the information. For example, the wireless device may identify the most demanding antenna port (and/or any other suitable criteria associated with the antenna ports) among the antenna ports in the history buffer, and the wireless device may determine the reserve for the most demanding antenna port regardless of whether the most demanding antenna port is currently active. The one or more reserves may include a first reserve allocated to certain communications (e.g., high priority communications) and/or a second reserve allocated for a high power transmission burst (or any other suitable transmission). In some cases, the wireless device may allocate a reserve per cell group (e.g., a group of carriers), a reserve per cell (e.g., carrier), and/or a reserve per sub-carrier (e.g., a bandwidth part or sub-channel). The wireless device may be capable of communicating via multiple cell groups, cells, and/or sub-carriers via one or more subscriptions (e.g., via multiple subscriber identity modules (SIMs) or universal SIMs (USIMs)) with one or more wireless networks. The reserve may correspond to an area under a transmit power over time (e.g., $P_{reserve}$ over a specific duration), where the area may include a portion (or all) of the area under a power limit (e.g., $P_{limit}$) over a time-averaging time window.

At block 606, the wireless device may transmit a first signal via a first antenna port (e.g., the first antenna port 244a) at a first transmit power determined based at least in part on the one or more reserves while maintaining at least a portion of the one or more reserves for a future transmission (e.g., the second transmission occasion 504) via a second antenna port. For example, the wireless device may transmit the first signal to a second wireless communication device (e.g., any of the second wireless devices 104 depicted in FIG. 1). The first signal may indicate (or carry) any of various information, such as data or control information. A transmission may be allocated all or some of the transmit power area (e.g., the area associated with $P_{reserve}$ over a specific duration) associated with a reserve. The wireless device may maintain (e.g., hold or keep) a portion of the reserve(s) for a future transmission via a second antenna port. The reserve maintained for the future transmission may be determined according to certain information associated with the second antenna port as described herein.

In certain aspects, the information may include any of various parameters associated with the transmission characteristics of an antenna port, for example, as described herein with respect to FIG. 4. For example, the information includes, for each of the plurality of antenna ports, an indication of a difference of a maximum transmit (output) power (e.g., $P_{CMAX}$) and a maximum time-averaged transmit power (e.g., $P_{limit}$). In certain aspects, the information includes, for each of the plurality of antenna ports, an indication of a relationship between a maximum transmit (output) power and a maximum time-averaged transmit power (e.g., $ratio_{ap} = P_{CMAX\_dB,ap} - P_{limit\_dB,ap}$). In some cases, the information includes, for each of the plurality of antenna ports, an indication of the reserve(s) to be used for the respective antenna port. The information may include, for each of the plurality of antenna ports an identifier associated with the respective antenna port (e.g., AP ID), a maximum time-averaged transmit power (e.g., $P_{limit}$) associated with the respective antenna port, a target transmit power (e.g., which may be less than or equal to $P_{CMAX}$), an indication of when the respective antenna port was last used for transmission (e.g., an inactivity time), a duration of a time-averaged time window associated with the respective antenna port (e.g., the time window 302), or a combination thereof.

For certain aspects, to determine the reserve(s), the wireless device may identify a particular antenna port among the antenna ports in the history buffer based on any of various criteria (e.g., the most demanding antenna port), and the wireless device may determine the reserve(s) for that particular antenna port regardless of whether the antenna port is actively transmitting or expected to actively transmit. As an example, the wireless device may determine a greatest (e.g., largest) value among power differences (e.g., $ratio_{ap} = P_{CMAX\_dB,ap} - P_{limit\_dB,ap}$ for each of the antenna ports) associated with the plurality of antenna ports. The wireless device may determine the reserve(s) based on the greatest value associated with the respective antenna port. For example, the wireless device may determine the reserve(s) that will allow compliance with an RF exposure limit (e.g., $P_{limit}$) associated with the respective antenna port.

In certain aspects, the wireless device may track the history buffer associated with the antenna ports. The wireless device may update the history buffer periodically and/or in response to certain criteria, such as encountering a new antenna port, expecting a new antenna port, switching to a different antenna port, etc. For example, the wireless device may keep certain antenna ports in the history, such as the recently used antenna ports. The plurality of antenna ports may be a set of antenna ports that have been involved in transmission in a time period. The time period may be based on a time-averaging time window associated with an RF exposure limit (e.g., the time window 302 and/or $T_{inactivity}=T_{RFexposureWindow}\cdot F$). The plurality of antenna ports may be a set of antenna ports that are active (or expected to be active, for example, in a future time interval) when determining the reserve(s). In some cases, an antenna port is considered as being active if the antenna port will be involved in transmission in a particular time interval (e.g., the future time interval 306). The plurality of antenna ports may be a set of antenna ports that have been active during a time the wireless device has been operational. The time the wireless device has been operational corresponds to a time the wireless device has been powered on or resumed from a particular state (e.g., a sleep mode, idle mode, or airplane mode). The plurality of antenna ports may include all of the antenna ports of the wireless device.

The wireless device may determine the first transmit power to be in compliance with an RF exposure limit while maintaining the reserve(s) for the future transmission (e.g., a transmission in the future time interval 306 or the second transmission occasion 504). For example, the wireless device may determine the first transmit power for a future time interval (e.g., the future time interval 306) based at least in part on the transmit power history (e.g., the transmit powers associated with the past time interval 304), the reserve(s) determined at block 604

In certain aspects, the wireless device may switch to transmitting via a different antenna port, for example, as described herein with respect to FIG. 5. The wireless device may transmit a second signal via a second antenna port (e.g., the second antenna port 244b) at a second transmit power that uses at least the portion of the reserve(s), for example, as described herein with respect to FIG. 5. In some cases, the wireless device may transmit the second signal in a different transmission occasion from the first signal as depicted in FIG. 5. For example, the wireless device may transmit the first signal in the first transmission occasion 502 via the first antenna port, and the wireless device may transmit the second signal in the second transmission occasion 504 via the second antenna port. In certain cases, the reserve(s) may facilitate transmissions via multiple antenna ports (e.g., the first antenna port and the second antenna port) in the same time interval, such as the future time interval 306, 308.

For certain aspects, the reserve(s) may include a first reserve allocated to certain communications (e.g., high priority communications) and/or a second reserve allocated for a high power transmission burst (or any other suitable transmission), such as a burst depicted in FIG. 3, where a high power transmission burst may correspond to a transmission at a transmit power greater than $P_{limit}$ or any other threshold power. The reserve(s) may be associated with any of various types of (or certain) communications and/or transmissions. For example, the wireless device may use the reserve(s) for certain communications and/or transmissions, such as high priority communications and/or a high power transmission burst(s). The reserve(s) may be associated with a particular type of transmission, where the particular type of transmission includes a transmission associated with a high priority service relative to a plurality of priorities, where the priority may correspond to a quality of service parameter and/or specific configuration identifying the various priorities. For example, the particular type of transmission (and/or corresponding high priority service) may include voice traffic (e.g., voice-over-LTE or voice-over-NR), video traffic, gaming traffic, video conferencing traffic, over-the-top communications (OTTC) traffic, control signaling (e.g., uplink control information, radio resource control signaling, medium access control signaling, or the like), hybrid automatic repeat request (HARQ) feedback, or any combination thereof.

In certain aspects, the wireless device may update the reserve(s), update the history buffer (e.g., remove or add antenna ports to the history buffer), and/or update how the history buffer is maintained (e.g., how antenna ports are added or removed from the history buffer) in response to one or more criteria being satisfied. As an example, the wireless device may update the one or more reserves (e.g., increase or decrease the reserves) in response to one or more criteria being satisfied. In some cases, the one or more criteria may be satisfied when more reserve(s) are not being fully used for the second antenna port (for example, if the reserve usage is less than or equal to a particular threshold). In such cases, the wireless device may decrease the reserve(s) allocated for the second antenna port. In addition or alternatively, the wireless device may update the history buffer or select a different approach at maintaining the history buffer (e.g., a different subset of antenna ports). In certain cases, the one or more criteria may be satisfied when the reserve usage for the second antenna port is greater than or equal to a threshold. In such cases, the wireless device may increase the reserve allocation for the second antenna port. In addition or alternatively, the wireless device may ensure the second antenna port remains in the history buffer. In certain aspects, the one or more criteria may be satisfied when a change to the history buffer is made (e.g., when an antenna port is added or removed from the history buffer) to trigger a re-determination of the antenna port associated with the reserve(s) and the corresponding reserve level(s).

While the examples provided herein are described with respect to a wireless device determining a reserve applicable to multiple antenna ports to facilitate understanding, aspects of the present disclosure may also be applied to any other antenna categorization, such as antenna groups. For example, the wireless device may determine a reserve associated with an antenna group, where the reserve can satisfy the transmit properties (e.g., $P_{limit}$ and $P_{CMAX}$) among multiple antenna groups. An antenna group may include a set of one or more antenna ports, antennas, antenna modules, and/or antenna arrays.

Aspects of the present disclosure may be applied to any of various wireless communication devices (wireless devices) that may emit RF signals causing exposure to human tissue, such as a base station and/or a CPE, performing the RF exposure compliance described herein.

Example Communications Device

Figure 7:
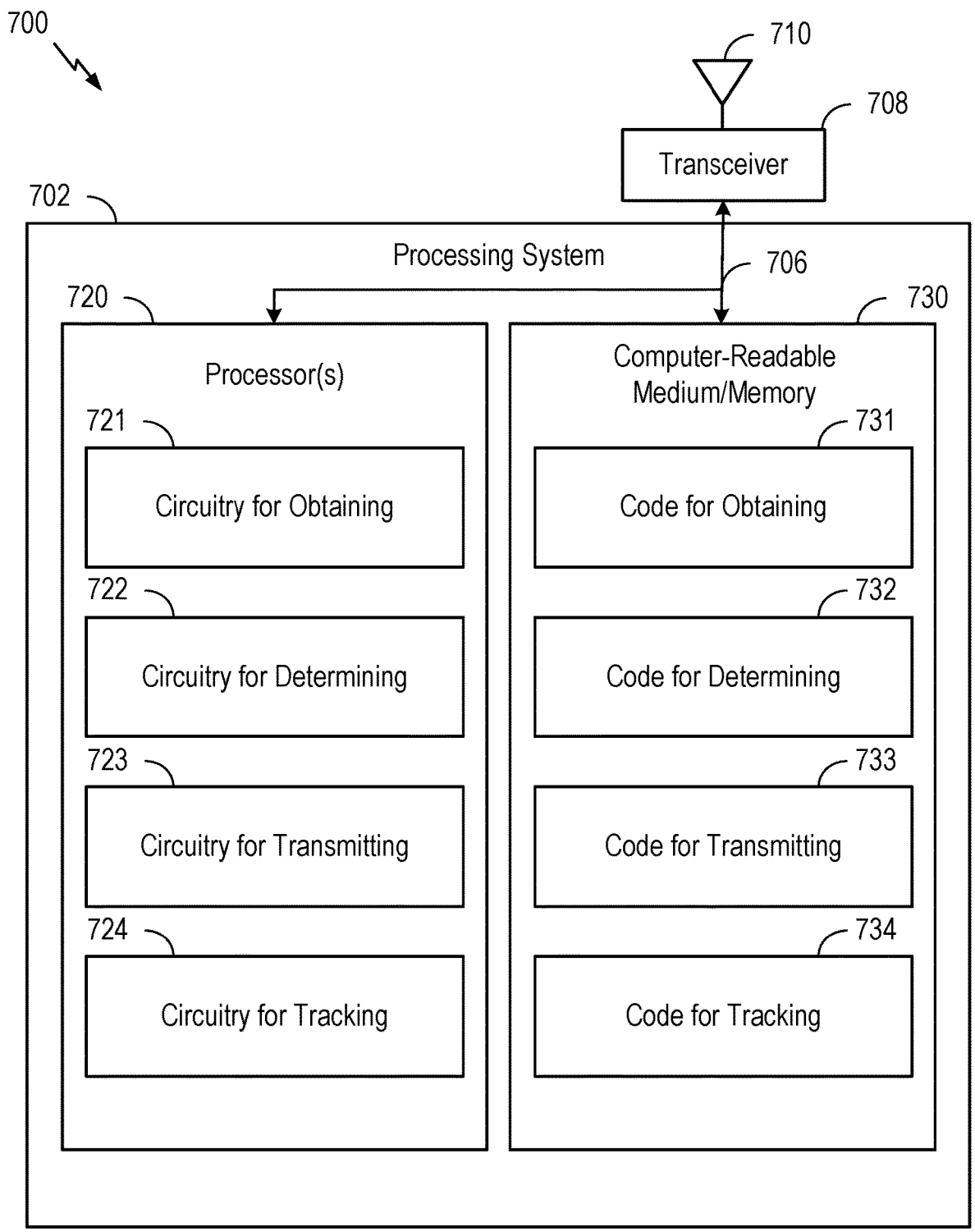
FIG. 7 illustrates a communications device that may include various components configured to perform operations for the techniques disclosed herein.

FIG. 7 depicts aspects of an example communications device 700. In some aspects, communications device 700 is a wireless communication device, such as the first wireless device 102 described above with respect to FIGS. 1 and 2.

The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes one or more processors 720. In various aspects, the one or more processors 720 may be representative of any of the processor 210 and/or the modem 212, as described with respect to FIG. 2. The one or more processors 720 are coupled to a computer-readable medium/memory 730 via a bus 706. In certain aspects, the computer-readable medium/memory 730 is configured to store instructions (e.g., computer-executable code) that when executed by the one or more processors 720, cause the one or more processors 720 to perform the operations 600 described with respect to FIG. 6, or any aspect related to the operations described herein. Note that reference to a processor performing a function of communications device 700 may include one or more processors performing that function of communications device 700.

In the depicted example, computer-readable medium/memory 730 stores code (e.g., executable instructions) for obtaining 731, code for determining 732, code for transmitting 733, code for tracking 734, or any combination thereof. Processing of the code 731-734 may cause the communications device 700 to perform the operations 600 described with respect to FIG. 6, or any aspect related to operations described herein.

The one or more processors 720 include circuitry configured to implement (e.g., execute) the code stored in the computer-readable medium/memory 730, including circuitry for obtaining 721, circuitry for determining 722, circuitry for transmitting 723, circuitry for tracking 724, or any combination thereof. Processing with circuitry 721-724 may cause the communications device 700 to perform the operations 600 described with respect to FIG. 6, or any aspect related to operations described herein.

Various components of the communications device 700 may provide means for performing the operations 600 described with respect to FIG. 6, or any aspect related to operations described herein. For example, means for transmitting, sending or outputting for transmission may include the TX path 214 and/or antenna(s) 218 of the first wireless device 102 illustrated in FIG. 2 and/or transceiver 708 and antenna 710 of the communications device 700 in FIG. 7. Means for receiving or obtaining may include the RX path 216 and/or antenna(s) 218 of the first wireless device illustrated in FIG. 2 and/or transceiver 708 and antenna 710 of the communications device 700 in FIG. 7. Means for obtaining, means for determining, and/or means for tracking may include a processor, such as the processor 210 and/or modem 212 depicted in FIG. 2 and/or the processor(s) 720 in FIG. 7.

Example Aspects

Implementation examples are described in the following numbered clauses:

Aspect 1: A method of wireless communication by a wireless device, comprising: obtaining information associated with a plurality of antenna ports; determining one or more reserves based at least in part on the information; and transmitting a first signal via a first antenna port at a first transmit power determined based at least in part on the one or more reserves while maintaining at least a portion of the one or more reserves for a future transmission via a second antenna port.

Aspect 2: The method of Aspect 1, wherein the information includes, for each of the plurality of antenna ports, an indication of a difference of a maximum transmit power and a maximum time-averaged transmit power.

Aspect 3: The method of Aspect 1 or 2, wherein the information includes, for each of the plurality of antenna ports, an indication of a relationship between a maximum transmit power and a maximum time-averaged transmit power.

Aspect 4: The method according to any of Aspects 1-3, wherein the information includes, for each of the plurality of antenna ports, an indication of the one or more reserves to be used for the respective antenna port.

Aspect 5: The method according to any of Aspects 1-4, wherein the information includes, for each of the plurality of antenna ports: an identifier associated with the respective antenna port; a maximum time-averaged transmit power associated with the respective antenna port; a target transmit power; an indication of when the respective antenna port was last used for transmission; a duration of a time-averaged time window associated with the respective antenna port; or a combination thereof.

Aspect 6: The method according to any of Aspects 1-5, wherein determining the one or more reserves comprises: determining a greatest value among power differences associated with the plurality of antenna ports; and determining the one or more reserves based on the greatest value associated with the respective antenna port.

Aspect 7: The method according to any of Aspects 1-6, wherein obtaining the information comprises tracking the information as a history buffer associated with the plurality of antenna ports.

Aspect 8: The method according to any of Aspects 1-7, wherein the plurality of antenna ports is a set of antenna ports that have been involved in transmission in a time period.

Aspect 9: The method of Aspect 8, wherein the time period is based on a time-averaging time window associated with a radio frequency (RF) exposure limit.

Aspect 10: The method according to any of Aspects 1-9, wherein the plurality of antenna ports is a set of antenna ports that are active when determining the one or more reserves.

Aspect 11: The method of Aspect 10, wherein an antenna port is considered as being active if the antenna port will be involved in transmission in a particular time interval.

Aspect 12: The method according to any of Aspects 1-11, wherein the plurality of antenna ports is a set of antenna ports that have been active during a time the wireless device has been operational.

Aspect 13: The method of Aspect 12, wherein the time the wireless device has been operational corresponds to a time the wireless device has been powered on.

Aspect 14: The method according to any of Aspects 1-13, wherein the plurality of antenna ports includes all of the antenna ports of the wireless device.

Aspect 15: The method according to any of Aspects 1-14, further comprising: determining the first transmit power to be in compliance with an RF exposure limit while maintaining the one or more reserves for the future transmission, and updating the one or more reserves in response to one or more criteria being satisfied.

Aspect 16: The method according to any of Aspects 1-15, further comprising: transmitting a second signal via the second antenna port at a second transmit power that uses the at least the portion of the one or more reserves.

Aspect 17: The method according to any of Aspects 1-16, wherein the one or more reserves are associated with a particular type of transmission.

Aspect 18: The method of Aspect 17, wherein the particular type of transmission includes a transmission associated with a high priority service relative to a plurality of priorities.

Aspect 19: The method of Aspect 17 or 18, wherein the particular type of transmission includes: voice traffic; video traffic; gaming traffic; video conferencing traffic; over-the-top communications (OTTC) traffic; control signaling; hybrid automatic repeat request (HARQ) feedback; or any combination thereof.

Aspect 20: An apparatus for wireless communication, comprising: a memory; and a processor coupled to the memory, the processor being configured to: obtain information associated with a plurality of antenna ports; determine one or more reserves based at least in part on the information; and control transmission of a first signal via a first antenna port at a first transmit power determined based at least in part on the one or more reserves while maintaining at least a portion of the one or more reserves for a future transmission via a second antenna port.

Aspect 21: The apparatus of Aspect 20, further comprising a transmitter configured to transmit the first signal via the first antenna port, wherein the information includes, for each of the plurality of antenna ports, an indication of a difference of a maximum transmit power and a maximum time-averaged transmit power.

Aspect 22: The apparatus of Aspect 20 or 21, wherein the information includes, for each of the plurality of antenna ports, an indication of a relationship between a maximum transmit power and a maximum time-averaged transmit power.

Aspect 23: The apparatus according to any of Aspects 20-22, wherein the information includes, for each of the plurality of antenna ports, an indication of the one or more reserves to be used for the respective antenna port.

Aspect 24: The apparatus according to any of Aspects 20-23, wherein the information includes, for each of the plurality of antenna ports: an identifier associated with the respective antenna port; a maximum time-averaged transmit power associated with the respective antenna port; a target transmit power; an indication of when the respective antenna port was last used for transmission; a duration of a time-averaged time window associated with the respective antenna port; or a combination thereof.

Aspect 25: The apparatus according to any of Aspects 20-24, wherein to determine the one or more reserves, the processor is further configured to: determine a greatest value among power differences associated with the plurality of antenna ports; and determine the one or more reserves based on the greatest value associated with the respective antenna port.

Aspect 26: The apparatus according to any of Aspects 20-25, wherein to obtain the information, the processor is further configured to track the information as a history buffer associated with the plurality of antenna ports.

Aspect 27: The apparatus according to any of Aspects 20-26, wherein the processor is further configured to: control transmission of a second signal via the second antenna port at a second transmit power that uses the at least the portion of the one or more reserves, and update the one or more reserves in response to one or more criteria being satisfied.

Aspect 28: The apparatus according to any of Aspects 20-27, wherein the one or more reserves are associated with a particular type of transmission.

Aspect 29: The apparatus of Aspect 28, wherein the particular type of transmission includes a transmission associated with a high priority service relative to a plurality of priorities.

Aspect 30: An apparatus for wireless communication, comprising: means for obtaining information associated with a plurality of antenna ports; means for determining one or more reserves based at least in part on the information; and means for transmitting a first signal via a first antenna port at a first transmit power determined based at least in part on the one or more reserves while maintaining at least a portion of the one or more reserves for a future transmission via a second antenna port.

Aspect 31: An apparatus, comprising: a memory comprising computer-executable instructions; and one or more processors configured to execute the computer-executable instructions and cause the apparatus to perform a method in accordance with any of Aspects 1-19.

Aspect 32: An apparatus, comprising means for performing a method in accordance with any of Aspects 1-19.

Aspect 33: A non-transitory computer-readable medium comprising computer-executable instructions that, when executed by one or more processors of a processing system, cause the processing system to perform a method in accordance with any of Aspects 1-19.

Aspect 34: A computer program product embodied on a computer-readable storage medium comprising code for performing a method in accordance with any of Aspects 1-19.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, identifying, tracking, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication by a wireless device, comprising:
   obtaining information associated with a plurality of antenna ports;
   determining one or more reserves based at least in part on the information; and
   transmitting a first signal via a first antenna port at a first transmit power determined based at least in part on the one or more reserves while maintaining at least a portion of the one or more reserves for a future transmission via a second antenna port.

2. The method of claim 1, wherein the information includes, for each of the plurality of antenna ports, an indication of a difference of a maximum transmit power and a maximum time-averaged transmit power.

3. The method of claim 1, wherein the information includes, for each of the plurality of antenna ports, an indication of a relationship between a maximum transmit power and a maximum time-averaged transmit power.

4. The method of claim 1, wherein the information includes, for each of the plurality of antenna ports, an indication of the one or more reserves to be used for the respective antenna port.

5. The method of claim 1, wherein the information includes, for each of the plurality of antenna ports:
   an identifier associated with the respective antenna port;
   a maximum time-averaged transmit power associated with the respective antenna port;
   a target transmit power;
   an indication of when the respective antenna port was last used for transmission;
   a duration of a time-averaged time window associated with the respective antenna port; or
   a combination thereof.

6. The method of claim 1, wherein determining the one or more reserves comprises:
   determining a greatest value among power differences associated with the plurality of antenna ports; and
   determining the one or more reserves based on the greatest value associated with the respective antenna port.

7. The method of claim 1, wherein obtaining the information comprises tracking the information as a history buffer associated with the plurality of antenna ports.

8. The method of claim 1, wherein the plurality of antenna ports is a set of antenna ports that have been involved in transmission in a time period.

9. The method of claim 8, wherein the time period is based on a time-averaging time window associated with a radio frequency (RF) exposure limit.

10. The method of claim 1, wherein the plurality of antenna ports is a set of antenna ports that are active when determining the one or more reserves.

11. The method of claim 10, wherein an antenna port is considered as being active if the antenna port will be involved in transmission in a particular time interval.

12. The method of claim 1, wherein the plurality of antenna ports is a set of antenna ports that have been active during a time the wireless device has been operational.

13. The method of claim 12, wherein the time the wireless device has been operational corresponds to a time the wireless device has been powered on.

14. The method of claim 1, wherein the plurality of antenna ports includes all of the antenna ports of the wireless device.

15. The method of claim 1, further comprising:
   determining the first transmit power to be in compliance with an RF exposure limit while maintaining the one or more reserves for the future transmission.

16. The method of claim 1, further comprising:
   transmitting a second signal via the second antenna port at a second transmit power that uses the at least the portion of the one or more reserves; and
   updating the one or more reserves in response to one or more criteria being satisfied.

17. The method of claim 1, wherein the one or more reserves are associated with a particular type of transmission.

18. The method of claim 17, wherein the particular type of transmission includes a transmission associated with a high priority service relative to a plurality of priorities.

19. The method of claim 17, wherein the particular type of transmission includes:
 voice traffic;
 video traffic;
 gaming traffic;
 video conferencing traffic;
 over-the-top communications (OTTC) traffic;
 control signaling;
 hybrid automatic repeat request (HARQ) feedback; or
 any combination thereof.

20. An apparatus for wireless communication, comprising:
 memory; and
 one or more processors coupled to the memory, the one or more processors being configured to:
  obtain information associated with a plurality of antenna ports;
  determine one or more reserves based at least in part on the information; and
  control transmission of a first signal via a first antenna port at a first transmit power determined based at least in part on the one or more reserves while maintaining at least a portion of the one or more reserves for a future transmission via a second antenna port.

21. The apparatus of claim 20, further comprising a transmitter configured to transmit the first signal via the first antenna port, wherein the information includes, for each of the plurality of antenna ports, an indication of a difference of a maximum transmit power and a maximum time-averaged transmit power.

22. The apparatus of claim 20, wherein the information includes, for each of the plurality of antenna ports, an indication of a relationship between a maximum transmit power and a maximum time-averaged transmit power.

23. The apparatus of claim 20, wherein the information includes, for each of the plurality of antenna ports, an indication of the one or more reserves to be used for the respective antenna port.

24. The apparatus of claim 20, wherein the information includes, for each of the plurality of antenna ports:
 an identifier associated with the respective antenna port;
 a maximum time-averaged transmit power associated with the respective antenna port;
 a target transmit power;
 an indication of when the respective antenna port was last used for transmission;
 a duration of a time-averaged time window associated with the respective antenna port; or
 a combination thereof.

25. The apparatus of claim 20, wherein to determine the one or more reserves, the one or more processors are further configured to:
 determine a greatest value among power differences associated with the plurality of antenna ports; and
 determine the one or more reserves based on the greatest value associated with the respective antenna port.

26. The apparatus of claim 20, wherein to obtain the information, the one or more processors are further configured to track the information as a history buffer associated with the plurality of antenna ports.

27. The apparatus of claim 20, wherein the one or more processors are further configured to:
 control transmission of a second signal via the second antenna port at a second transmit power that uses the at least the portion of the one or more reserves, and
 update the one or more reserves in response to one or more criteria being satisfied.

28. The apparatus of claim 20, wherein the one or more reserves are associated with a particular type of transmission.

29. The apparatus of claim 28, wherein the particular type of transmission includes a transmission associated with a high priority service relative to a plurality of priorities.

30. An apparatus for wireless communication, comprising:
 means for obtaining information associated with a plurality of antenna ports;
 means for determining one or more reserves based at least in part on the information; and
 means for transmitting a first signal via a first antenna port at a first transmit power determined based at least in part on the one or more reserves while maintaining at least a portion of the one or more reserves for a future transmission via a second antenna port.

* * * * *